United States Patent [19]
Catlin

[11] Patent Number: 5,983,835
[45] Date of Patent: Nov. 16, 1999

[54] STAND STAY STILTS TRAINING KIT

[76] Inventor: Susan Carlyle Catlin, 3449 Poplar Dr., Kennesaw, Ga. 30144

[21] Appl. No.: 08/933,637

[22] Filed: Sep. 19, 1997

[51] Int. Cl.[6] .................................................. A01K 15/04
[52] U.S. Cl. ............................................................. 119/753
[58] Field of Search ................................... 119/753, 754, 119/755, 756, 757, 673, 671, 712

[56] References Cited

U.S. PATENT DOCUMENTS

| | | | |
|---|---|---|---|
| 83,672 | 11/1868 | Styer | 119/757 |
| 2,187,337 | 1/1940 | Wang | 119/755 |
| 2,804,845 | 9/1957 | Plumley et al. | 119/756 |
| 4,693,212 | 9/1987 | Black | 119/755 |

FOREIGN PATENT DOCUMENTS 5486 of 1901 United Kingdom .................. 119/755

Primary Examiner—Michael J. Carone
Assistant Examiner—James S. Bergin
Attorney, Agent, or Firm—Arnall Golden & Gregory, LLP

[57] ABSTRACT

Animals are trained to stand and stay with all four feet on the ground in the desired position by placing the animal's feet on four stable, elevated, immobilized supports, then praising the animal for standing in the desired position. This process is repeated until the animal has learned the meaning of the command to stand and stay. It is essential that the supports be immobilizable and sturdy enough to support the animal without the animal being afraid it will fall. In the preferred embodiment, the upper surface of the supports are approximately the same size as, or only slightly larger than, the animal's foot, and is covered with a non-slip surface. The support is designed to elevate the animal's foot so that it does not want to remove the foot to the surface on which the support is immobilized. The supports must be immobilizable relative to each other so that the animal is forced to stand in the desired position.

13 Claims, 2 Drawing Sheets

5,983,835

STAND STAY STILTS TRAINING KIT

BACKGROUND OF THE INVENTION

Training animals to stand for an examination or presentation in a show ring has traditionally involved a certain amount of negative reinforcement, i.e., stern voice correction, choke chain correction, and/or physical correction. An animal considers standing as anything other than sitting or laying down, and does not understand the concept of not moving a single foot. When asking an animal to stand and stay on level ground, it means to the animal to remain upright in a non-sitting or non-lying position. If the animal receives a negative correction for moving its foot, the animal loses its enthusiasm and willingness to respond to the handler.

To date, no other means for teaching an animal to stand stay, without any negative corrections, has been available.

It is therefore an object of the present invention to provide a kit for training an animal such as a dog or horse to stand.

It is a further object of the present invention to provide a method for training an animal to stand stay without negative reinforcement.

SUMMARY OF THE INVENTION

Animals are trained to stand and stay with all four feet on the ground in the desired position by placing the animal's feet on four stable, elevated, immobilized supports, then praising the animal for standing in the desired position. This process is repeated until the animal has learned the meaning of the command to stand and stay. Depending on the intelligence of the animal, this may accomplished in a single training session lasting only a short time.

It is essential that the supports be immobilizable and sturdy enough to support the animal without the animal being afraid it will fall. In the preferred embodiment, the upper surface of the supports are approximately the same size as, or only slightly larger than, the animal's foot, and is covered with a non-slip surface. The support is designed to elevate the animal's foot so that it does not want to remove the foot to the surface on which the support is immobilized. This is usually between one and eighteen inches in height, most typically between four and five inches for training dogs. The supports must be immobilizable relative to each other so that the animal is forced to stand in the desired position. In its simplest form, these can be immobilized on the ground using a spike on the bottom of the support to secure it in position; in a more preferred embodiment, the supports are immobilizable by means of a clamp, for example, onto a veterinary or grooming table, or by magnetic means or VEICRO™ like attachments onto a surface such as sheet metal or a VELCRO™ covered wood or plastic sheet.

BRIEF DESCRIPTION OF THE DRAWINGS

FIGS. 4A–C show how the carrying/training box is folded and closed, from the side and top views, respectively.

DETAILED DESCRIPTION OF THE INVENTION

Training Kit

Supports

The training kit, in its simplest form, consist of four pedestals which can be immobilized to a surface to form a stable support. These pedestals, referred to herein as "supports", are elevated, i.e., serve to support an animal's foot in a position above the ground or surface on which the support is placed; stable, i.e., does not bend, collapse, or fall over when the animal's foot is placed on the uppermost portion; and immobilizable in a position on a desired surface.

The dimensions are designed based on the animal which is to be trained. It is evident that the materials used to construct, as well as the dimensions, for supporting a 1200 pound horse will be different from that of a two pound dog. The exact shape of the support is not important. FIGS. 1A–1G are exemplary designs used as supports for training dogs.

Figure 2A:
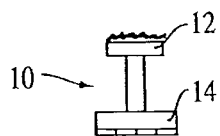
FIGS. 2A–C are a side view, top view and bottom view, respectively, of a support. Scale is 1:6.

In general, the support must sufficiently elevate the foot as to discourage the animal from trying to remove the foot from the support, but not so high as to render the support unstable. See FIG. 2A, a side view of a typical support 10, showing the relative size of the upper surface 12, relative to the lower portion 14.

The upper surface of the support will be sufficiently large for the foot to be placed on the surface, without any portion of the foot extending over the edges. It will not typically be much larger than the foot, since this would not discourage all movement of the foot. See FIG. 2B.

The lower portion of the support may be the same or a larger size than the upper portion of the support, in order to maximize stability and to assist in immobilization, especially in those cases where the support is immobilized by magnetic or interlocking means. See FIG. 2C.

Exemplary dimensions for training a small dog are a base or lower portion diameter of three inches, an upper surface having a diameter of 1½ inches, and a height of four inches. The dimensions for the same supports for a medium dog would be a base of three inches in diameter, an upper surface diameter of 1¾ inches, and a height of four one-half inches. The dimensions for a large dog would be four inches, three inches, and four and one-half inches, respectively.

Figure 2B:
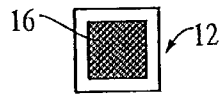
Figure 2C:
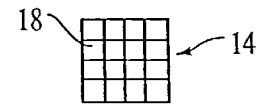

The support must be immobilizable. In a preferred embodiment, the support is immobilized using means such as a magnetic surface affixed to the bottom of the support. This is shown in FIG. 2C where sixteen magnetic tiles 18 are adhered to the bottom of the support. The magnetic tiles 18 secure the support in position when placed on a metal surface. In alternative embodiments, the support can be immobilized through means such as VELCRO™ interlocking mesh, snaps, hooks, or other traditional means that allow the support to be movably but stably positioned on a surface.

Although depicted by reference to a surface which is provided for placement on another surface, the supports can be directed affixed to any table or crate, using clamps or other conventional means to secure the supports in position.

In a preferred embodiment for larger animals, the support is immobilized on the ground using stakes or nails on the bottom of the supports, which are then driven into the ground.

It is preferred that the top surface be formed of a non-slip surface. As shown in FIG. 2B, an abrasive non-slip plastic surface 16 can be glued onto the top surface 12 of the support 10.

Training Surface

Figure 1A:
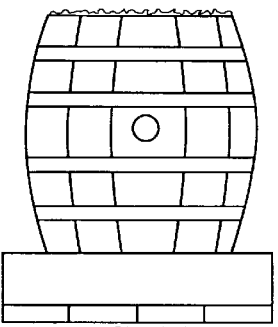
FIGS. 1A–H are designs of supports for use in training dogs. Scale is 1:1.5.
Figure 1B:
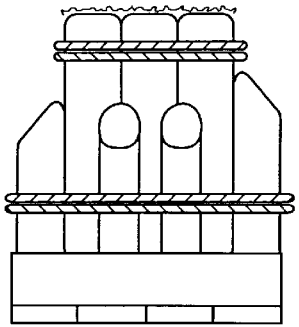
Figure 1C:
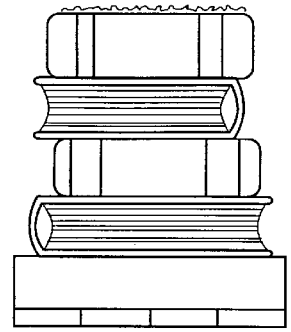
Figure 1D:
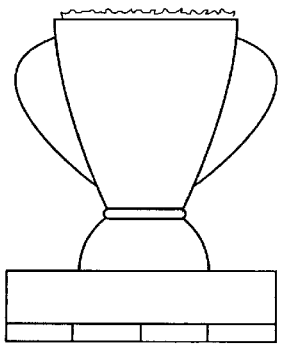
Figure 1E:
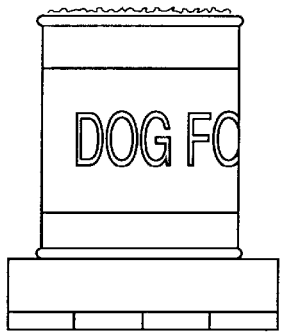
Figure 1F:
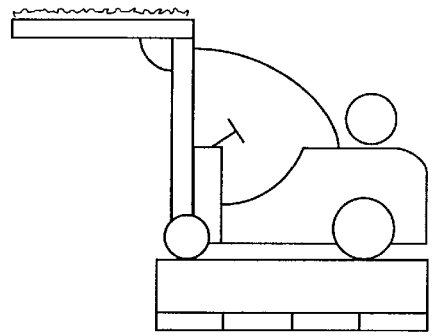
Figure 1H:
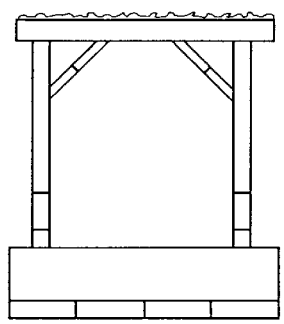
Figure 1G:
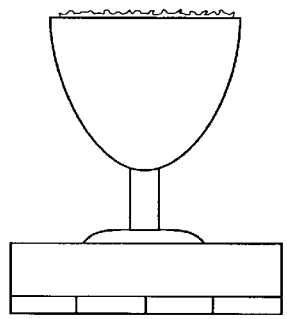
Figure 3A:
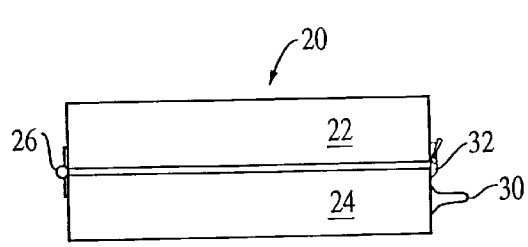
FIGS. 3A–B are a top view and side view, respectively, of the supports positioned and immobilized in a dual carrying/training box.
Figure 3A:
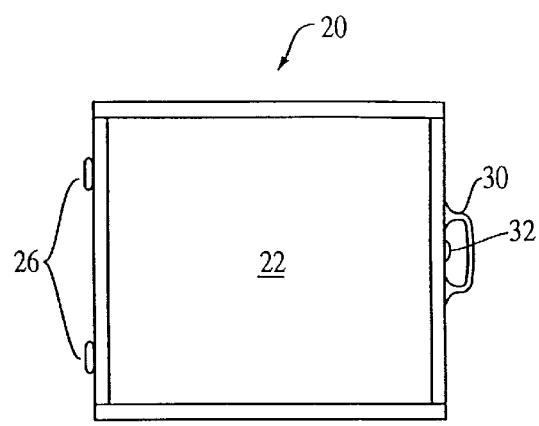
Figure 3A:
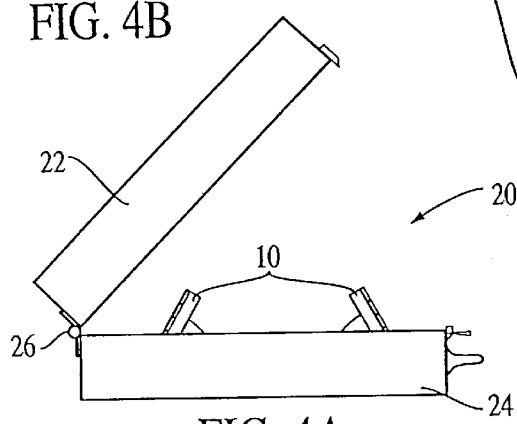
Figure 3A:
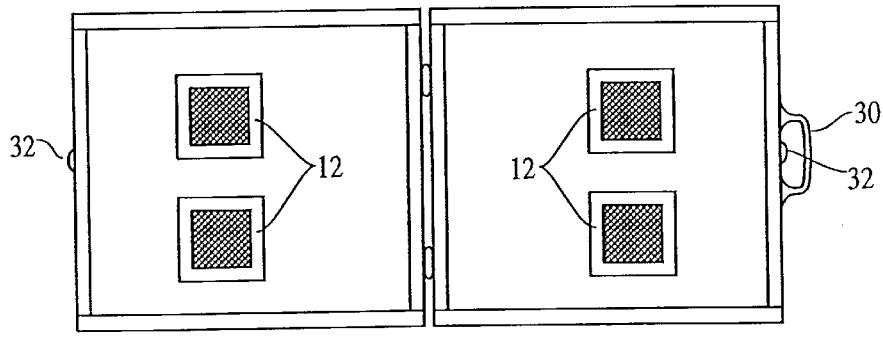
Figure 3B:
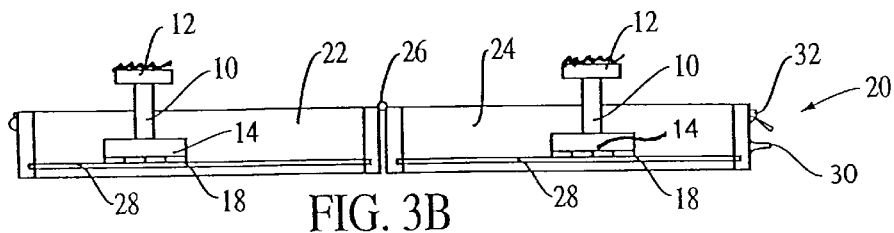

As discussed above, it is not essential to provide a surface specifically designed for use with the supports. However, in a preferred embodiment, the supports 10 are provided in a box or kit 20 having two halves 22 and 24 connected by a hinge 26, as shown in FIGS. 3A and 3B. When opened, the supports 10 are positioned relative to each other so that the animal's feet are positioned in the desired places. The halves 22 and 24 fold together for storage of the supports, with minimal space requirements. An advantage of the box 20 is that it can include a surface 28 formed of a material which can be used to immobilize the supports 10. In a preferred embodiment using magnetic tiles 18 on the bottom of the supports 14, the surface 28 is formed of sheet metal, which is inlaid in a wooden or plastic box 20. A carrying handle 30 and latch 32 complete the kit.

The dimensions of the box are designed to provide stable support for all four feet of the animal, and will therefore be determined based on the size of the animal. For example, for training of dogs, in the preferred embodiment, the dimensions of the boxes for toy dogs are ten by twelve inches, for medium size dogs are twelve by sixteen inches, and for large dogs are sixteen by eighteen inches.

Training Method

Animals are trained to stand as desired using the supports as follows. The supports are immobilized relative to each other so that the animal, when standing with one foot on each support, is positioned as desired. The animal is then placed on the supports. This is achieved according to the animal to be trained. A toy dog can be lifted in one hand and the other used to place each foot on a single support. A horse or cow will typically be led to the supports, then each foot individually lifted up onto a support.

The animal is restrained during this process, using a collar and leash or grooming table noose, or for a larger animal, a halter and lead. The animal can be held by the individual training the animal, an assistant, or by securing the animal to a restraining means.

The animal is then provided with positive reinforcement, such as food and/or praise, while a training cue telling the animal that it is to "stand" and "stay" is given. The training cue can be verbal and/or a jesture such as a tap on the shoulder. Since the goal is to achieve proper stance with animation and a positive outlook, negative corrections are to be avoided.

The training process must be tailored to an individual animal. Some animals learn that staying in position in rewards in a single five to fifteen minute training session; others require repeated training sessions, either on the same or consecutive days. Once the animal understands that he is rewarded for standing in a particular position, he is transferred to the ground and the same training cue given. If the animal adopts the desired position, he is rewarded. If not, he is again positioned on the supports and the process repeated.

Modifications and variations of the present training kit and method of use thereof will be obvious to those skilled in the art. Such modifications and variations are intended to come within the scope of the appended claims.

I claim:

1. A kit for training a four legged animal to stand in a desired position comprising four immobilizable, stable elevated supports, each support having an upper surface providing a stable support for an animal's foot and a lower portion which can be immobilized to a surface, wherein each support elevates the animal's foot in an amount effective to deter the animal from moving its foot off each support in the absence of physical restraints, wherein a material preventing the animal's foot from slipping is placed on the upper surface of each support.

2. The kit of claim 1 further comprising a supporting surface which can be used to immobilize the supports, wherein the lower portion of each support is immobilizable by means adhering each support to the supporting surface.

3. The kit of claim 2 wherein the adhering means is magnetic and the supporting surface is formed of metal.

4. The kit of claim 2 further comprising storage means, wherein the supporting surface fits in the storage means and the supports can be positioned on the supporting surface within the storage means at the desired distances for training the animal.

5. The kit of claim 1 further comprising clamping or retaining means for securing the supports to a table or animal cage or crate.

6. The kit of claim 1 wherein the supports comprise means for securing the supports to the ground.

7. A method for training a four legged animal to stand in a desired position comprising positioning four immobilizable, stable elevated supports, each support having an upper surface providing a stable support for an animals' foot and a lower portion which can be immobilized to a supporting surface, wherein each support elevates the animal's foot in an amount effective to deter the animal from moving its foot off each support in the absence of physical restraints, wherein the animal can be placed on the supports in the desired position, and positioning the animal on the supports.

8. The method of claim 7 further comprising restraining the animal from moving off of the supports.

9. The method of claim 8 further comprising providing positive reinforcement to the animal for standing in the desired position while providing a training cue telling the animal it is to stand and stay on the supports.

10. The method of claim 9 further comprising removing the animal from the supports and providing the training cue and positive reinforcement for standing and staying in the desired position.

11. The method of claim 8 further comprising positioning a supporting surface which can be used to immobilize the supports, wherein the lower portion of each support is immobilizable by means adhering the support to the supporting surface, and immobilizing the supports on the supporting surface in the desired position for the animal to place its feet.

12. The method of claim 8 further comprising immobilizing the supports by securing the supports to a table or animal cage or crate.

13. The method of claim 8 wherein the supports comprise means for securing the supports to the ground, further comprising immobilizing the supports by securing the supports on the ground where the animal is to be trained.

* * * * *